Aug. 5, 1952 R. M. SOMERS 2,606,253
CONTROL SYSTEM FOR PHONOGRAPHS OF THE COMBINED RECORDING-REPRODUCING TYPE
Original Filed Jan. 4, 1947
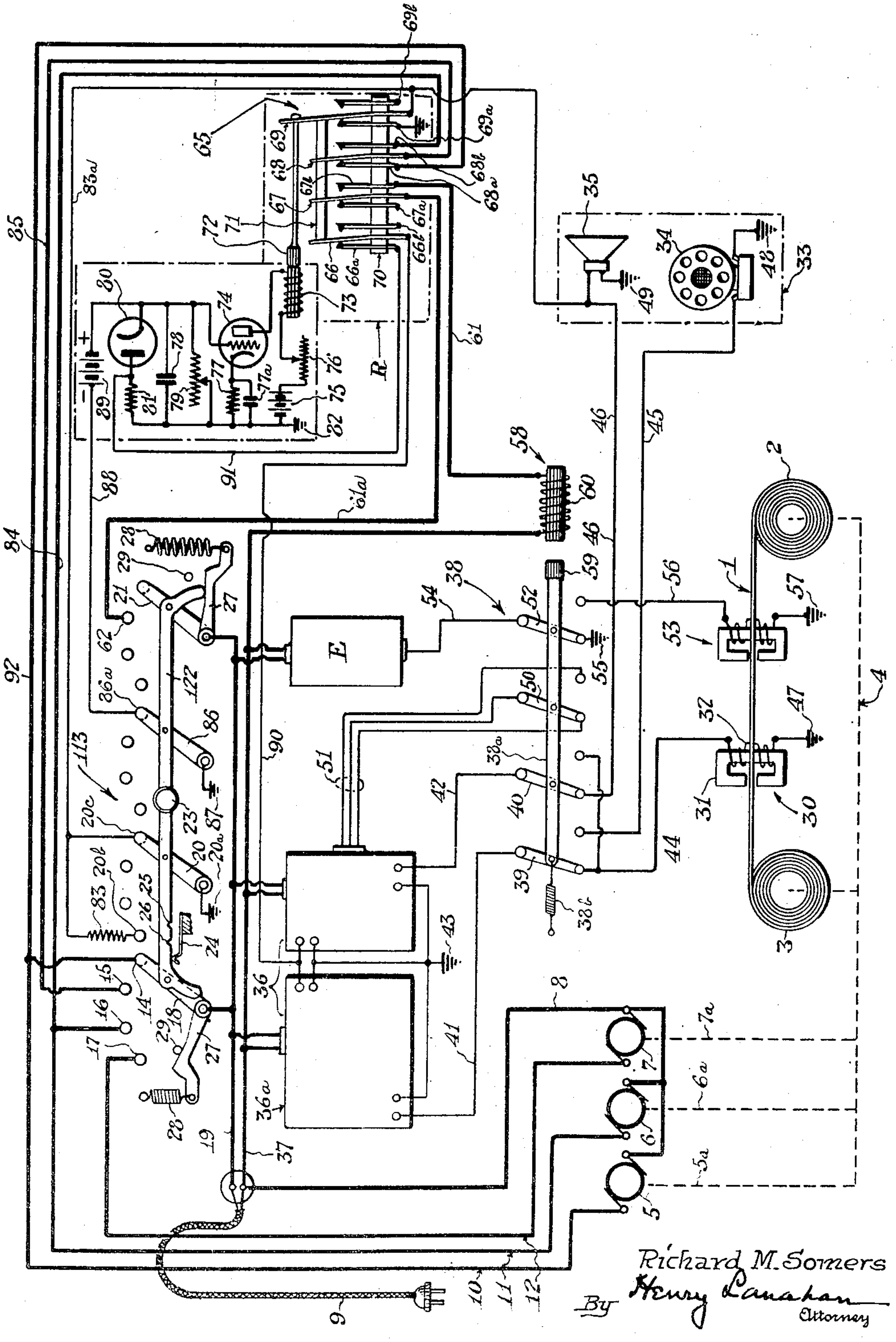
Richard M. Somers
By Henry Lanahan
Attorney Patented Aug. 5, 1952 2,606,253

UNITED STATES PATENT OFFICE 2,606,253

CONTROL SYSTEM FOR PHONOGRAPHS OF THE COMBINED RECORDING-REPRODUCING TYPE

Richard M. Somers, West Orange, N. J., assignor to Thomas A. Edison, Incorporated, West Orange, N. J., a corporation of New Jersey Original application January 4, 1947, Serial No. 720,197. Divided and this application October 1, 1949, Serial No. 119,165

14 Claims. (Cl. 179—100.4)

This application is a division of my pending application Serial No. 720,197, filed January 4, 1947 and entitled "Reel-Type Phonographic Machine" (now Patent No. 2,536,666 dated January 2, 1951).

This invention relates to improvements in phonographs for recording and reproducing dictation, and more particularly the invention relates to an improved control system which is especially adapted to enhance the value of reel-type phonographs for recording and reproducing dictation. The invention has particular application in magnetic reel-type phonographic machines known as telegraphones, and is herein described in connection with such a machine, but without any unnecessary limitation thereto being intended.

It is a practical requirement of a dictating machine that it be arranged so that the operator can "listen back" conveniently to selected portions of prior recorded matter without distracting his thoughts from his subject of dictation and without undue waste of time. A defect of reel-type dictating machines is that a relatively long time is required to backspace to a selected part of the recordation if one has recorded considerably beyond that part—since backspacing in this type of machine is accomplished by moving the record with respect to the translating device along the length of the recordation—and again another considerable time is required, after reproducing that selected part, to return to the last prior recorded position of farthest advance. These defects have been mitigated somewhat in these machines by providing a drive system selectively operable to advance and backspace the record at a fast speed in addition to the normal advance for recording and reproducing, the fast speed operation being so that the operator can backspace quickly to a prior position of recordation and then after listening to a selected portion of the recordation next advance quickly to the last prior position of farthest advance on the record for resumption of further recordation of dictation.

The present invention resides particularly in the provision of a novel control mechanism for a dictating machine which is adapted to enable an operator to resume recordation, after listening back to a selected portion of recorded matter, with a minimum of attention given to the machine. This invention is particularly adapted for use with reel-type phonographs having facility for fast backspacing and fast advance of the record as above explained, but is not necessarily limited either to reel-type phonographs or to such phonographs having this facility.

A particular object of the invention is to provide a novel and improved control mechanism, especially adapted for reel-type phonographs, for restoring automatically such machines to recording condition upon return, after a backspacing operation, to the last prior recorded position of farthest advance.

Another object is to provide such an automatic restoring mechanism which is put into operation by performing a simple momentary manipulation on the machine.

A feature of this automatic control mechanism lies in the utilization of signal currents reproduced from the record to maintain the control apparatus in an operated position until the prior recorded position of farthest advance is reached.

These and other objects and features of my invention will be apparent from the following description and the appended claims.

In the description of my invention reference is had to the accompanying drawing showing circuits and mechanism of a magnetic type recording-reproducing machine incorporating an automatic control mechanism according to my invention for restoring the machine to normal condition for recording upon return, after a backspacing operation, to the prior position of farthest advance.

In the drawing a phonographic machine is shown as comprising a record 1 of wire or tape form, typically of magnetizable material, which is drawn from a supply roll 2 and wound onto a take-up reel 3 in the way commonly employed in such mchines. The particular coupling mechanism by which the reels are so driven is herein diagrammatically indicated as 4 since it is well known in the art and a detailed description thereof is unnecessary for the purposes of the present invention. In the present invention, however, the record is driven at different speeds in both forward and backward directions. For simplification of the description this is shown as being accomplished by three separate motors 5, 6 and 7 having respective drive connections 5a, 6a and 7a to the mechanism 4 abovementioned. The motor 5 is adapted to drive the record forwardly at a fast speed, say ten times normal speed; the motor 6 is adapted to drive the record forwardly at normal speed; and the motor 7 is adapted to drive the record in a backward direction also at a fast speed of say ten times normal speed. These motors have one common power supply lead 8 from a cable 9 which is adapted for plug-in connection to a power source, and have respective other leads 10, 11 and 12 which lead to one section of a manually-operable three-pole four-position master switch 113. This one section comprises a terminal 14 connected to the lead 10, a terminal 15 connected by way of lead 85, switch members 68 and 68a of a current-operable multiple switch 65 hereinafter described, and a lead 84 to the lead 11, a terminal 16 connected directly to the lead 11 and a terminal 17 connected to the lead 12. A pivoted switch pole member 18 is selectively engageable with these terminals and is connected by a lead 19 to the other side of the power cable 9. When the master switch 113 is in a "backspacing" or "first terminal" position corresponding to the left-hand position of the pole 18, the latter contacts the terminal 17 to energize the motor 7 and cause the record to be driven backward at a fast speed. When the master switch is moved rightwardly into the next succeeding positions respectively referred to as its "reproduce" and "record" positions, the pole 18 contacts the terminals 16 and 15 to cause the motor 6 to be energized and the record to be driven forwardly at normal speed in each of these positions. When the master switch is moved farther rightwardly into a "restoring" or "second terminal" position, the pole 18 contacts the terminal 14 to cause the motor 5 to be energized and the record to be driven in a forward direction at a fast speed.

The master switch has three other pole members 20, 86 and 21 in the order here named, the functions of which are hereinafter described. All of these pole members are mechanically connected together by an insulating tie bar 22 on which there is a fingerpiece or knob 23 for manually operating the switch. A detent spring 24 is positioned to engage respective notches 25 and 26 in the tie bar when the master switch is in reproduce and record positions respectively, the purpose of this engagement being to detent the master switch in these respective positions. However, as the master switch is moved into its first and second terminal positions, the end portions of the tie bar abut against pivoted levers 27 biased by respective springs 28 against respective stops 29. These biased levers serve to return the master switch to its reproduce and record positions upon manual release of the switch from its first and second terminal positions respectively.

Associated with the record 1 is an electromagnetic translating means for recording on and reproducing from the record. This translating means may, for example, be a unitary translating device 30 adapted to serve either as a recorder or as a reproducer. This device comprises a magnetic core 31 having confronting poles at opposite sides of the record and having a coil 32. This coil is connected in an audio system which is selectively conditionable for recording and reproducing. This audio system comprises a transducer 33 usable either as a microphone or sound receiver but comprising preferably separate microphone and receiver units 34 and 35, an electrical amplifier 36 energized from the power cable 9 by way of the lead 19 and a lead 37, and a two-position four-pole selector switch 38 the poles of which are mechanically coupled together by an insulating tie bar 38a. Two poles 39 and 40 of this switch are connected by leads 41 and 42 to one side of the input and output respectively of the amplifier 36, the other side of the amplifier input and output being grounded at 43. Associated with the pole 39 is a leftward terminal connected by a lead 44 to one side of the coil 32 and a rightward terminal connected by a lead 45 to the microphone 34. Associated with the pole 40 is a left terminal connected by a lead 46 to the receiver 35 and a right terminal connected also by the lead 44 to the coil 32. The coil 32, microphone 34 and receiver 35, like the amplifier 36, each have one side grounded as at 47, 48 and 49 respectively. When the selector switch is in reproduce position, as shown, the pole 39 connects the translating device, acting as a reproducer, to the input of the amplifier and the pole 40 connects the output of the amplifier to the receiver 35 to condition the audio system for reproducing. Conversely, when the selector switch is thrown to its record position the pole 39 connects the microphone 34 to the amplifier input, and the pole 40 connects the output of the amplifier to the translating device, acting now as a recorder, to condition the audio system for recording.

A third pole 50 of the selector switch 38 and two associated terminals are connected by three leads, generally referred to as 51, to the amplifier 36. This section of the selector switch 38 is intended for modifying the amplifier circuit. It may for example be adapted for changing the gain of the amplifier as the audio system is conditioned for recording and reproducing or, alternatively, for cutting in an automatic volume control during recording and disabling it during reproducing as taught by Dunning Patent No. 2,163,671.

A fourth pole 52 of the switch 38 controls a system for erasing signals from the magnetic record 1. This system comprises a translating device 53, which may be the same as the device 30 above described, and an eraser E comprising a high-frequency oscillator energized by way of the leads 19 and 37. The eraser E has an output lead 54 connected to the pole 52. Associated with this pole 52 is a left terminal grounded at 53 and a right terminal connected by a lead 56 to one side of the coil of the translatng device 53, the other side of this coil being grounded at 57.

The switch 38 is spring-urged leftwardly into reproduce position as by a tension spring 38b. Actuation of the switch into record position is effected by an electromagnet 58 comprising an armature 59 connected to the tie bar 38a. This electromagnet has a coil 60 one side of which is connected to the power lead 37 and the other side of which is connected by a lead 61, switch members 67 and 67b of a switch 65 and a lead 61a to a terminal 62 positioned for engagement with the pole member 21 when the master switch 113 is in record position, all other positions of this pole 21 being idle. The pole 21 is connected to the other power lead 19. Upon the switch 65 being in unoperated position—which is a rightward position of the pole elements thereof as the switch appears in the figure—and the master switch 113 being in record position, power is supplied to the electromagnet 58 to attract theretowards the armature 59 on the end of the tie bar 38a of the selector switch 38, thus placing this selector switch in record position. In all positions of the master switch 113, except the record position thereof, the electromagnet 58 is unenergized and the selector switch 38 is then held by the spring 38b in reproduce position.

The second pole 20 of the master switch is grounded at 20*a*. When the master switch is in its first terminal position this pole engages a terminal 20*b* connected by way of a resistor 83 and line 83*a* to the live side of the receiver 35, to place the resistor 83 in parallel with the receiver. This resistor has a value sufficient to attenuate the sound output of the audio system to a low level of audibility. When the master switch is in record and reproduce positions the pole 20 is disconnected from this circuit and the audio system is in a condition for normal operation; however, when the master switch is in its second terminal position, the pole 20 engages a terminal 20*c* connected directly to the line 83*a*, and places thus a direct short on the receiver 35 to wholly disable the audio system.

The operation of the master switch 113 in using the present phonograph as a dictating machine will be understood to be as follows: For normal recording, the master switch 113 is placed in record position. This completes the circuit of the motor 6 and of the electromagnet 58, by way of contact points 68—68*b* and 67—67*b* respectively of the multiple switch 65, to cause the record to be advanced at normal speed and the selector switch 38 to be placed in record position, the effect of the latter being to condition the audio system for recording and to put the eraser system into operation. If the operator desires to listen back to a portion of his recorded dictation, he will move the master switch 113 to its first terminal position; this completes the circuit of the motor 7 by way of the leads 12 and 8, to cause fast backspacing of the record, and also it opens the circuit of the electromagnet 58 so that the selector switch 38 is returned to reproduce position to condition the audio system for reproducing. However, the resistor 83 is now connected across the receiver 35 to attenuate to a low level of audibility the reproduced gibberish sounds produced during the fast backspacing. When the operator believes the record is backspaced sufficiently he will release the master switch 113, allowing it to return automatically by one of the springs 28 to reproduce position. The effect of this change in the positioning of the master switch is to stop motor 7 and to start motor 6 so that the record will be advanced again at normal speed; also, this change of positioning of the master switch removes the partial short of the receiver 35 so that the audio system is restored to normal operation for reproducing. The selected recorded matter is therefore next reproduced. If the operator does not desire to listen back to all of the recorded matter on the record past which the record has been backspaced, he will advance the master switch to its second terminal position when he has completed listening to the selected portion of recorded matter, and will then release the master switch to allow it to return automatically to record position. In accordance with the present invention, this momentary positioning of the master switch in its second terminal position puts into operation an automatic restoring means which maintains fast advance of the record until the prior position of farthest advance is reached and which then automatically restores the phonograph to normal recording condition. This automatic restoring means is controlled by signals picked up from the record by the translating device 30 during the fast advance of the record to the prior position of farthest advance as is herein next explained.

The automatic restoring means comprises a relay R which includes the aforestated "current-operable switch 65." This is a two-position multiple switch having four poles 66, 67, 68 and 69 insulatedly mounted in a stack 70 and mechanically connected to each other by an insulating tie bar 71. Also in the stack 70 there are left and right contacts for each pole, referred to by the number of the respective pole with the suffix letters *a* and *b*. The poles are connected to an armature 72 which is actuated electromagnetically by a coil 73. This coil is connected in the plate circuit of a vacuum tube 74 which may suitably be a triode as shown. The plate circuit is energized, for example, by a battery 75 through an adjustable resistor 76 which is adjustable to set the sensitivity of the relay. The tube 74 is self-biased by a resistor 77 in its cathode circuit typically shunted by a condenser 77*a*. Connected to the grid of this tube is a time-delay circuit comprising a condenser 78 and a resistor 79 of which the latter is adjustable to set the timing to a desired value. In parallel with this time-delay circuit is a rectifier 80 and a resistor 81 connected in series. The grid, cathode and plate circuits have a common ground at 82.

The tube 74 is biased by the resistor 77 to such an extent that the plate current is normally insufficient to hold the relay R operated; accordingly, the switch 65 is normally in an unoperated or rightward position wherein the poles thereof make with the respective contacts having the suffix letter *b*. However, upon impressing a positive potential of suitable value on the grid of the tube, the plate current is increased and the relay is operated to cause the poles to make with the leftward contacts having the suffix letter *a*, which is the position of the switch 65 shown in the drawing.

When the master switch is thrown to its second terminal position the pole 86, which is permanently connected to ground at 87, makes contact with terminal 86*a* connected to a trigger circuit 88. This trigger circuit leads to the grid of the tube 74 and serially includes a battery 89 polarized so as to apply a positive potential on the grid of the tube 74 when the trigger circuit is closed, this potential serving to operate the relay R as explained. The operation of the relay R initiates the automatic restoring means so that the operator may release the master switch from its second terminal position, to allow it to return automatically to record position under influence of one of the springs 28, and thereupon await the automatic restoration of the machine to record condition when the prior recorded position of farthest advance is reached, as is herein next explained.

When the master switch is moved into its second terminal position current is supplied to the fast-advance motor 5 by way of the lead 10, terminal 14 and pole 18. Upon releasing the master switch for automatic return to record position after the relay R is operated, the motor 5 is still operated by its current-supply circuit, now by way of lead 10, lead 92, contacts 68*a*—68 of the relay switch 65, lead 85 and pole 18. This fast advance of the record is maintained so long as the relay switch 65 is operated. When the relay switch is returned to unoperated position, the contacts 68—68*a* are broken to stop the fast-advance motor 5, and the contacts 68—68*b* are closed to start the normal-advance motor 6, the circuit of the motor 6 being now completed by way of pole 18, lead 85, contact 68—68*b*, lead 84 and lead 11.

As the relay R is energized to move the switch 65 to operated position, the circuit of the electromagnet 58 is broken by the switch elements 67—67b and the selector switch 38 is moved immediately to reproduce position by the spring 38b. Also when the relay R is energized, the resistor 81 is connected across the output of a voltage section 36a of the amplifier 36 by way of lead 90, pole 66 and contact 66a of switch 65, and lead 91. Signals which are picked up by the translating device 30, now operating as a reproducer, from the previously recorded portion of the record 1 are amplified by the amplifier section 36a and fed across the resistor 81. Signal voltage which is so developed across the resistor 81 is rectified by the rectifier 80 and fed through the time-delay circuits 78—79 to the grid of the tube 74, the rectifier being so polarized that this rectified signal voltage appears on the grid as a positive potential. This generated positive potential serves as a holding voltage to hold the relay R in operated position after the trigger circuit 88 is broken by the release of the master switch to record position. Since this generated positive potential appears on the grid circuit almost immediately after the trigger circuit 88 is closed by the movement of the master switch 13 to its second terminal position, the operator may remove his hand from the master switch almost the instant it has reached its second terminal position, to allow the switch to return to record position and, notwithstanding, the relay R will be maintained in operated position by the reproduced signal currents.

In order that normal interruption in the reproduced signal currents may not cause release of the relay R to unoperated position, there is provided the time-delay circuit 78—79 between the rectifier 80 and the grid of the tube 74. This time-delay circuit does not produce any substantial delay to build-up of the voltage applied to the grid, with the result that the relay R will be operated almost immediately after the master switch is moved to its second terminal position. However, this circuit 78—79 has a time delay on discharge of the condenser 78, which is typically of the order of one half to one second, so that short blank (unrecorded) spaces on the record will not cause release of the relay R.

Whenever the relay R is in operated position, the selector switch 38 is in reproduce position because the circuit of the electromagnet 58 is then broken by the contacts 67—67b. The audio system is not however then in operable reproducing condition since the contacts 69—69a of the relay R are now closed to place a short on the receiver 35. Thus, after closing the master switch to its second terminal position to initiate fast return to the prior recorded position of farthest advance, and automatic restoration to normal recording condition when that position is reached, no audible signal currents are produced.

Since the record is driven forwardly at fast speed during return to the prior recorded position of farthest advance, substantial interruptions in the recordations on the record are insufficient to cause the relay R to be released particularly in view of the action of the time-delay circuit 78—79. When, however, the record has returned to its prior recorded position of farthest advance, the signals picked up by the translating device 30 will cease, the holding current in the plate circuit of the tube 74 will return to its normal low level and the relay R will return to unoperated position in response to the natural biasing of the poles 66—69. As aforestated, as the relay R returns to unoperated position, contacts 68—68a open to stop motor 5 and contacts 68—68b close to start motor 6; also, at the same time, contacts 67—67b are closed to energize the electromagnet 58 to put the audio system into recording condition.

From the foregoing description of this embodiment it will be understood that when the user has backspaced to listen to a selected portion of his recorded dictation, but has not reproduced all of the dictated matter traversed by the translating device 30 in the backspacing operation, he can after completing the reproducing operation restore the machine quickly to condition for recording simply by momentarily holding the master switch in its second terminal position, for in so doing he starts the return to the prior position of farthest advance at a fast speed and causes the record speed to be reduced to normal and the audio system to be conditioned for recording when that prior farthest-advance position is reached.

While I have hereinabove described my invention in terms of a certain preferred embodiment, it will be understood that this embodiment is subject to changes and modifications without departure from the scope of my invention, which I endeavor to express according to the following claims.

I claim:

1. In a phonographic machine including movable supporting means for a record, record-cooperable translating means for recording on and reproducing from the record, a drive system coupled to said supporting means for moving said record in relation to said translating means and an audio system including said translating means and selectively conditionable for recording or reproducing: the combination of a control device movable into and out of "record" position; means for respectively placing said audio system into and out of condition for recording; means whereby said placing means is controlled by said control device as said device is moved into and out of said record position; means for maintaining the audio system out of condition for recording after return of said control device to record position so long as the record passing said translating means bears a recordation without substantial interruptions; and means whereby said maintaining means is rendered operative by said control device and is rendered responsive to said translating means as said control device is moved to place said audio system out of condition for recording.

2. In a phonographic machine including movable supporting means for a record, record-cooperable translating means for recording on and reproducing from the record, a drive system coupled to said supporting means for moving said record in relation to said translating means and an audio system including said translating means and selectively conditionable for recording or reproducing: the combination of a control device operable between "record" position and another position and biased into record position; means controlled by said control device as said device is moved into and out of said record position for respectively placing said audio system into and out of condition for recording; means for maintaining said audio system out of condition for recording after return of said control device to record position; means whereby said maintaining means is put in operation as said control device is moved out of record position; and means whereby said maintaining means is kept in operation by electric current from said translating means after return of said control device to record position so long as the record passing said translating means bears a recordation without substantial interruptions.

3. In a phonographic machine including movable supporting means for a record, record-cooperable translating means for recording on and reproducing from the record, a drive system coupled to said supporting means for moving said record in relation to said translating means and an audio system including said translating means and selectively conditionable for recording or reproducing: the combination of a control device operable between "record" position and another position; means controlled by said control device as said device is moved into and out of said record position for respectively placing said audio system into and out of condition for recording; and means for maintaining said audio system out of record condition after return of said control device to record position so long as the record passing said translating means bears a recordation without substantial interruptions, comprising means for initiating operation of said maintaining means as said control device is moved out of record position, means operatively connecting said maintaining means to said translating means as the maintaining means is put in operation whereby uninterrupted currents from said translating means are effective to keep the maintaining means in operation, and means for restoring the maintaining means to unoperated condition whenever a substantial blank space on the record passes said translating means.

4. In a phonographic machine including movable supporting means for a record, record-cooperable translating means for recording on and reproducing from the record, a drive system coupled to said supporting means for moving said record in relation to said translating means and an audio system including said translating means and selectively conditionable for recording or reproducing: the combination of a manual control device movable into and out of "record" position; a current-operable control device having first and second positions; means effective only when said manual device is in record position and said current-operable device is in a predetermined one of its positions for placing said audio system in condition for recording; means, rendered operative by said manual device as the same is moved out of recording position, for placing said current-operable device in the other of its positions; and means, rendered effective by said current-operable device as the latter is moved to said other position, for feeding a holding current to said current-operable device from signals picked up from the record by said translating means to maintain said current-operable device in said other position so long as the record passing said translating means bears a recordation without substantial interruptions.

5. In a phonographic machine including movable supporting means for a record, record-cooperable translating means for recording on and reproducing from the record, a drive system selectively controllable to advance said record at normal or fast speeds and an audio system selectively conditionable for recording or reproducing: the combination of a control device having "record" and "other" positions and biased when in said other position into record position; means controlled by said control device to render said drive system effective to product normal advance of the record and to condition said audio system for recording when the control device is in record position; means controlled by said control device to render said drive system effective to produce fast advance of the record and to connect said translating means for operation as a reproducer when the control device is in said other position; and means for maintaining said drive system effective to produce fast advance of the record after return of said control device to record position so long as the record portion passing said translating means bears a recordation without substantial interruptions, comprising means for putting said maintaining means in operation as said control device is moved to said other position and means operable by signals reproduced from the record by said translating means to keep said maintaining means in operation until a substantial blank space on the record passes said translating means.

6. In a phonographic machine including movable supporting means for a record, record-cooperable translating means for recording on and reproducing from the record, a drive system selectively controllable to advance said record at normal or fast speeds and an audio system selectively conditionable for recording or reproducing: the combination of a manual control device having "record" and "other" positions; means for biasing said manual device into record position when the same is in said other position; a current-operable control device having "operated" and "unoperated" positions and biased into the latter; means connected to said drive and audio systems and controlled jointly by said control devices to render said drive system effective to produce normal advance of the record and to condition said audio system for recording when said manual device is in said record position and said current-operable device is in unoperated position; means whereby said drive system is effective to produce fast advance of the record and said audio system is out of condition for recording when said current-operable device is in operated position; means rendered operable by said manual device as the same is moved to said other position to move said current-operable device into operated position; and means connected to said translating means by said current-operable device when the latter is in operated position for producing a holding current from signals picked up from the record to maintain the current-operable device in operated position after return of said manual device to record position so long as the record passing said translating means bears recorded signals without substantial interruptions.

7. The combination set forth in claim 6 including means controlled by said current-operable device for disabling said audio system when the current-operable device is in operated position.

8. The combination set forth in claim 6 wherein said manual device has also a "reproduce" position, including means controlled by said manual device when the same is in said reproduce position to effect normal advance of the record and to condition said audio system for reproducing.

9. In a phonographic machine including supporting means for a record and a record-cooperable translating means for recording on and reproducing from said record: the combination of a drive system adapted for selectively advancing said record at normal and fast speeds; a control device having "record," "reproduce" and "terminal" positions; means controlled by said control device and operatively coupled to said drive system to advance said record at normal speed when the control device is in record and reproduce positions respectively and including means to advance the record at fast speed when the control device is in terminal position; and means for maintaining a fast advance of said record after return of the control device from said terminal to record position so long as the record passing said translating means bears a recorded signal without substantial interruptions, comprising means operable by signal currents picked up from the record for keeping said maintaining means in operation, and means for restoring said maintaining means to unoperated condition should said signal currents be terminated for a predetermined period of time.

10. In a phonographic machine including a support for a record and a record-cooperable translating means for recording on and reproducing from said record: the combination of a drive system adapted for selectively advancing said record at normal and fast speeds; a control device having "record," "reproduce" and "terminal" positions; means connecting said control device to said drive system to cause normal advance of the record when the control device is in record and reproduce positions and including means to cause fast advance of the record when the control device is in terminal position; means effective to maintain fast advance of the record for a momentary period following return of the control device from said terminal to said record positions; and means connected to said translating means and operable by signal impulses picked up from said record, for maintaining said last-mentioned means in effective condition so long as the record passing said translating means bears a recordation without substantial interruptions, said last-stated means including time-delay means for holding said maintaining means in effective condition until a substantial blank space on said record passes said translating means.

11. In a phonographic machine including a support for a record and a record-cooperable translating means for recording on and reproducing from said record: the combination of a drive system adapted for selectively advancing said record at normal and fast speeds; a control device having "record," "reproduce" and "terminal" positions; means connecting said control device to said drive system to cause said record to be advanced at normal speed when the control device is in record and reproduce positions respectively, and including means to cause said record to be advanced at a fast speed when the control device is in said terminal position; means for momentarily maintaining fast advance of said record after return of said control device from said terminal to said record position; and means, including time-delay means and operable by signals picked up from said record, for maintaining fast advance of the record following the return of said control device to record position so long as the picked-up signals are without interruptions exceeding a predetermined period.

12. In a phonographic machine including a record, a record-cooperating translating means adapted to serve selectively as a recorder and as a reproducer, and an audio system associated with said translating means and selectively conditionable for recording and reproducing: the combination of a drive system for said record including control means selectively operable to advance said record at normal speed, and to advance and return said record at a fast speed; a control device placeable selectively into "record," "reproduce" and "first terminal" and "second terminal" positions beyond said record and reproduce positions respectively; means connecting said control device to said audio and drive systems to cause the audio system to be conditioned for reproducing and the record to be backspaced at fast speed when the control device is in said first terminal position, including means to cause the audio system to be in condition for reproducing and the record to be advanced at normal speed when the control device is in reproduce position, means to cause the audio system to be conditioned for recording and the record to be advanced at normal speed when the control device is in record position, and means to cause the audio system to be conditioned for reproducing and the record to be advanced at fast speed when the control device is in said second terminal position; and automatic means responsive to signals picked up from said record for causing said record to be advanced at fast speed following the return of said control device from said second terminal position to said record position so long as said picked-up signals are without substantial interruptions, including means connecting said automatic means to said control device to cause the automatic means to be in operation when the control device is put into said second terminal position.

13. In a phonographic machine including a record, a record-cooperating reproducer and means for driving said record at different speeds: the combination of a current-energizable control device for said driving means operable into different positions to change the speed of said record, means operable by signals picked up from said record by said reproducer for holding said control device in one position, manual means movable to supply initial energizing current to said control device to place the latter into said one position, and means operated by said control device as the same is moved to said one position for operatively connecting the control device to said reproducer.

14. In a phonographic machine including a support for a record, a record-cooperating reproducer and means for driving said support: the combination of a control relay for said driving means, a current-supply circuit for said relay normally ineffective to hold the relay in operated position; a control circuit for said current-supply circuit including time-delay means having a predetermined time-delay interval and energizable to cause operation of said relay, a manual control device, means controlled by said manual device for initially energizing said control circuit, and switch means included in said relay and closed as the relay is operated for connecting said control circuit to said reproducer to cause continued energization of said control circuit and maintenance of said relay in operated position so long as the signals picked up from the record are without interruptions exceeding said predetermined time interval.

RICHARD M. SOMERS.

(References on following page)

REFERENCES CITED

The following references are of record in the file of this patent:

UNITED STATES PATENTS

| Number | Name | Date |
|---|---|---|
| Re. 23,112 | Squire | May 10, 1949 |
| 2.100,434 | Davis | Nov. 30, 1937 |
| 2,214,482 | Schmidt | Sept. 10, 1940 |
| 2,229,430 | Warner | Jan. 21, 1941 |
| 2,294,963 | Clausen | Sept. 8, 1942 |
| 2,300,239 | Thiede | Oct. 27, 1942 |
| 2,306,614 | Clausen | Dec. 29, 1942 |
| 2,306,614 | Clausen | Dec. 29, 1942 |
| 2,340,606 | Mann | Feb. 1, 1944 |
| 2,375,525 | Clausen | May 8, 1945 |
| 2,391,897 | Harrington | Jan. 1, 1946 |
| 2,411,501 | Brubaker | Nov. 26, 1946 |